United States Patent
Lee

(10) Patent No.: US 8,693,467 B2
(45) Date of Patent: Apr. 8, 2014

(54) PROBLEM WITH GCSNA ARQ

(75) Inventor: Anthony S. Lee, San Diego, CA (US)

(73) Assignee: Via Telecom Co., Ltd, George Town (KY)

( * ) Notice: Subject to any disclaimer, the term of this patent is extended or adjusted under 35 U.S.C. 154(b) by 199 days.

(21) Appl. No.: 13/345,963

(22) Filed: Jan. 9, 2012

(65) Prior Publication Data

US 2012/0176908 A1 Jul. 12, 2012

Related U.S. Application Data

(60) Provisional application No. 61/430,876, filed on Jan. 7, 2011.

(51) Int. Cl.
*H04L 12/66* (2006.01)

(52) U.S. Cl.
USPC .......................................... 370/356; 370/912

(58) Field of Classification Search
USPC .......... 370/229, 235, 236, 310, 351, 352, 356
See application file for complete search history.

(56) References Cited

U.S. PATENT DOCUMENTS

2011/0286417 A1* 11/2011 Lair .............................. 370/329

OTHER PUBLICATIONS

E-UTRAN-cdma2000 1x Connectivity and Interworking Air Interface Specification, Apr. 2010, 3GPP2, Version 1.0, pp. 1-58.*

* cited by examiner

*Primary Examiner* — Omar Ghowrwal
(74) *Attorney, Agent, or Firm* — Richard K. Huffman; James W. Huffman

(57) ABSTRACT

An apparatus for notifying of a circuit switched event over a packetized data network. The apparatus includes a packetized data modem and an interworking interface. The packetized data modem is configured to transmit and receive packetized data over a packetized data radio link. The packetized data modem has a tunneling link access control processor that is configured to encapsulate/decapsulate data for a subset of sub-layers corresponding to a link access control layer of a circuit switched network model. The interworking interface is operatively coupled to the packetized data modem via the packetized data network, and is configured to notify the packetized data modem of the circuit switched event. The interworking interface has a link access control/tunneling link access control processor that is configured to encapsulate/decapsulate the data when performing notification of the circuit switched event.

20 Claims, 5 Drawing Sheets

ALTERNATIGE GCSNA1XSERVICE MESSAGE SEQUENCING FOR MOBILE STATION

PROBLEM WITH GCSNA ARQ

CROSS-REFERENCE TO RELATED APPLICATIONS

This application claims the benefit of the following U.S. Provisional Applications, each of which is herein incorporated by reference for all intents and purposes.

| Ser. No. | FILING DATE | TITLE |
| --- | --- | --- |
| 61/430,876 (VTU.11-0012-US) | Jan. 07, 2011 | PROBLEM WITH GCSNA ARQ |

BACKGROUND OF THE INVENTION

1. Field of the Invention

This invention relates in general to the field of cellular communications, and more particularly to an apparatus and method for precluding problems associated with notifying a mobile station of an incoming call over a packetized data radio link.

2. Description of the Related Art

The cell phone industry is undergoing exponential growth, not only in this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service. As such, so-called circuit switched voice links have been fielded that guarantee this quality of service.

And although wireless cellular network technologies have continued to provide improvements related to the ability to process voice calls, there has also been an enormous pull on the industry to provide for the reliable and efficient transfer of packetized data. As a result, the incremental developments in high speed packetized data networks have not always tracked with the development of voice networks. It is a goal within the industry to field a more unified solution that would provide both reliable voice and high speed data access, however, the industry is not at that point presently. Consequently, it is common practice to field a mobile system that provides for voice communications over one type of circuit switched network, say CDMA2000 1×RTT, and high speed data communications over another type of network, say LTE, which provides exclusively for packetized data and does not provide the quality of service that users prefer to support voice communications. In the near future, these hybrid solutions will be prevalent within the art. Currently, a mobile station (i.e., a cell phone) that is capable of communicating over two distinctly different networks as alluded to above is known as a "dual mode" mobile station.

In order to field such a hybrid system, designers are forced to develop protocols for those instances where two or more co-fielded networks create conflict, or where two or more co-fielded networks are required to interoperate.

This application deals with one such instance, that is, the switching between a high speed data network that provides exclusively for packetized data communications over to a circuit switched voice network in order to process an incoming or outgoing call, or some other event that requires use of the circuit switched network.

Presently, protocols exist for fallback to a circuit switched network during a high speed data session in order to process an incoming or outgoing call. Most present day techniques follow a form of "tunneling," where notification data associated with the call is encapsulated into a sequence of data units that are exchanged over the packetized data network. Current provisions encapsulate essential data such as addressing and authentication information when notifying a mobile station of the call over the circuit switched link. One such protocol is defined in the $3^{rd}$ Generation Partnership Project 2 (3GPP2) Specification 3GPP2 C.S0097-0, Version 1.0, April, 2010, entitled "E-UTRAN-cdma2000 1× Connectivity and Interworking Air Interface Specification" © (hereinafter referred to as "Specification"), which is herein incorporated by reference for all intents and purposes. The Specification prescribes a compatibility standard for facilitating cdma2000 1× tunneling through any radio access technology (RAT), but not through High Rate Packetized Data (HRPD), and includes requirements on the Evolved Terrestrial Radio Access Network (E-UTRAN) and cdma2000 1× interworking. In addition to architectural reference models, layered tunneling model, and requirements for equipment, particularly mobile stations and interworking solutions (IWSs), a generic circuit services notification application (GCSNA) protocol is specified to support signaling transactions for cdma2000 1× circuit switched services between mobile stations and a 1× circuit switched IWS via any RAT which provides for a tunnel between the mobile stations and the IWS. The GCSNA protocol allows a dual mode mobile station that is registered with the 1× circuit switched system to enjoy the speed benefits of packetized data services over so-called 4G Long Term Evolution (LTE) networks (which employ E-UTRAN as the air interface for high speed packetized data services), while providing a fallback protocol to enable a mobile station to initiate and receive voice calls over the 1× circuit switched system.

Notwithstanding the desirable features that GCSNA provides for switching from LTE to 1×, the present inventors have observed that this protocol lacks the robust capabilities to function in poor coverage environments, particularly those in which packetized data units (PDUs) can be lost. More specifically, because the Specification allows network designers the flexibility to prescribe certain critical parameters to on an implementation by implementation basis, the present inventors have noted that it is possible for a dual mode mobile station or IWS to receive the same packet more than once without any form of duplication detection. And as one skilled in the art will appreciate, the aforementioned undesirable consequence of duplication could cause network destabilization, mobile station lockup, and inefficient use of processing and timing resources.

Accordingly, what is needed is a technique that would eliminate the possibility of duplicate packet reception in a dual mode communications system.

In addition, what is needed is an apparatus an method that provides for reliable GCSNA tunneling transactions between a mobile station and an interworking solution over a dual mode communications network.

SUMMARY OF THE INVENTION

The present invention, among other applications, is directed to solving the above-noted problems and addresses other problems, disadvantages, and limitations of the prior art. The present invention provides a superior technique for precluding erroneous duplicate message reception of circuit switched fallback notifications for both dual mode mobile stations and interworking interfaces that are both coupled to circuit switched and packetized data networks. In one embodiment, an apparatus provides notifications of a circuit switched event over a packetized data network. The apparatus includes a dual mode mobile station that is operatively coupled to a packetized data network, and that is configured to transmit and receive circuit switched fallback notifications to an interworking interface via a tunnel over the packetized data network. The mobile station includes a tunneling link access control processor that is configured to transmit a circuit service message to the interworking interface, and that is configured to monitor the packetized data network for reception of an acknowledgement message from the interworking interface, and that is configured to retransmit the circuit service message after expiration of an acknowledgement timer, where retransmission of the circuit service message is precluded by the tunneling link access control processor when a message sequence context timer expires.

One aspect of the present invention contemplates a method for providing notifications of a circuit switched event over a packetized data network. The method includes: via a dual mode mobile station that is operatively coupled to a packetized data network, transmitting and receiving circuit switched fallback notifications to an interworking interface via a tunnel over the packetized data network; via a tunneling link access control processor disposed within the dual mode mobile station, transmitting a circuit service message to the interworking interface, and monitoring the packetized data network for reception of an acknowledgement message from the interworking interface, and retransmitting the circuit service message after expiration of an acknowledgement timer; and precluding retransmission of the circuit service message by the tunneling link access control processor when a message sequence context timer expires.

Another aspect of the present invention comprehends an apparatus for providing notifications of a circuit switched event over a packetized data network. The apparatus has an interworking interface that is operatively coupled to a packetized data network, and that is configured to transmit and receive circuit switched fallback notifications to a dual mode mobile station via a tunnel over the packetized data network. The interworking interface has a tunneling link access control processor that is configured to transmit a circuit service message to the dual mode mobile station, and that is configured to monitor the packetized data network for reception of an acknowledgement message from the dual mode mobile station, and that is configured to retransmit the circuit service message after expiration of an acknowledgement timer, where retransmission of the circuit service message is precluded by the tunneling link access control processor when a message sequence context timer expires.

A further aspect of the present invention features a method for providing notifications of a circuit switched event over a packetized data network. The method includes: via an interworking interface that is operatively coupled to a packetized data network, transmitting and receiving circuit switched fallback notifications to a dual mode mobile station via a tunnel over the packetized data network; via a tunneling link access control processor disposed within the interworking interface, transmitting a circuit service message to the dual mode mobile station, and monitoring the packetized data network for reception of an acknowledgement message from the dual mode mobile station, and retransmitting the circuit service message after expiration of an acknowledgement timer; and precluding retransmission of the circuit service message by the tunneling link access control processor when a message sequence context timer expires.

BRIEF DESCRIPTION OF THE DRAWINGS

These and other objects, features, and advantages of the present invention will become better understood with regard to the following description, and accompanying drawings where.

DETAILED DESCRIPTION

Figure 1:
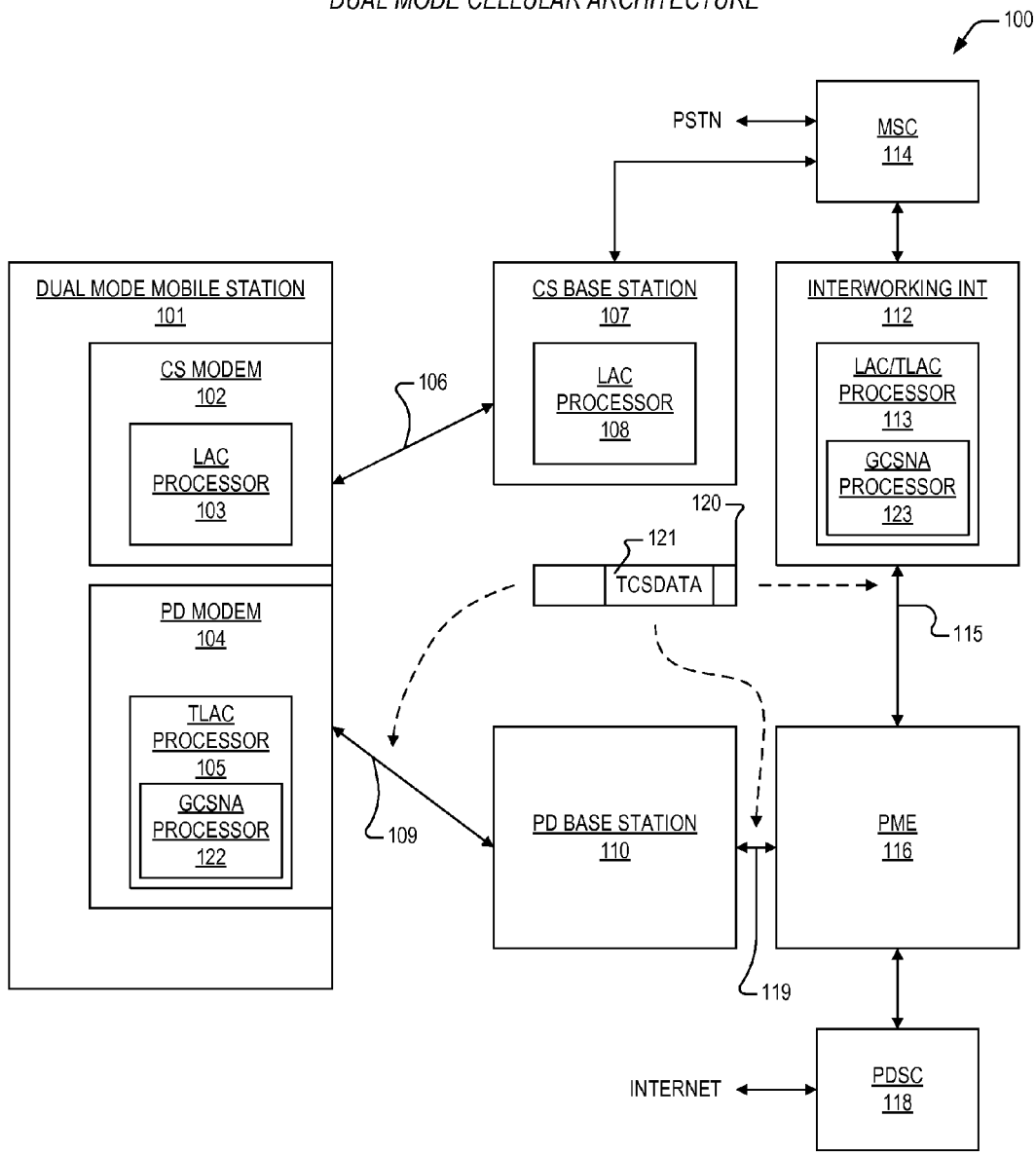
FIG. 1 is a block diagram illustrating a present day dual mode cellular architecture for notifying a dual mode mobile station of an incoming call or other circuit switched event over a packetized data radio link.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In view of the above background discussion on present day dual mode cellular architectures and associated techniques employed to notify a mobile station of a call over a packetized data radio link, a discussion of the limitations of these cellular architectures will be discussed with reference to FIGS. 1-2. Following this, a discussion of the present invention will be provided with reference to FIGS. 3-5. The present invention overcomes present day limitations and disadvantages by providing a tunneling architecture, apparatus, and method whereby unnecessary processing and packet duplication consequences are eliminated throughout a packetized data network that employs GCSNA for circuit switched fallback.

Consider FIG. 1, where a block diagram is presented illustrating a present day cellular architecture 100 for notifying a dual mode mobile station 101 of an incoming call or other circuit switched event over a packetized data radio link 109. The architecture 100 includes the mobile station 101, which has a circuit switched modem 102 for processing circuit switched cellular applications, and a packetized data modem 104, for processing packetized data applications. The mobile station 101 is coupled to a circuit switched base station 107 via a circuit switched radio link 106 and to a packetized data base station 110 over the packetized data radio link 109.

The circuit switched base station 107 is coupled to a mobile switching center 114. The mobile switching center 114 is coupled to an interworkng interface 112. The interworkng interface 112 is coupled to a packetized management entity (PME) 116 via a packetized data link 115. The mobile switching center 114 routes calls and events to/from a public switched telephone network (PSTN). The packetized management entity 116 is coupled to a packetized data switching center 118, which routes data and events to/from a packetized data network such as the internet.

In operation, circuit switched calls and events over the PSTN are routed by the mobile switching center 114 to the circuit switched base station 107. All control and traffic associated with the calls or other events occurs over the circuit switched radio link 106 is processed by the circuit switched modem 102 within the mobile station 101. Likewise, packetized data and events over the internet are routed by the packetized data switching center 118 to a particular packetized data mobility entity 116 that is interfaced to the packetized base station 110 currently assigned to the mobile station 101. All control and traffic associated with the packetized data or other events occurs over the packetized data radio link 109 is processed by the packetized data modem 104 within the mobile station 101.

Of particular interest to the present application are scenarios and circumstances associated with certain present day dual mode configurations, one example of which is a dual mode mobile station 101 that is capable of processing circuit switched calls and other events over a code demand multiple access (CDMA) radio link 106 such as might be found in a cdma200 1×RTT architecture, and that processes packetized data and other events over a packetized data radio link 109 such as might be found in a Long Term Evolution (LTE) architecture using E-UTRAN as the air interface for packet transfer. As one skilled in the art will appreciate, the cdmb200 1×RTT circuit switched architecture (or "1×" architecture) is well known in the art for processing circuit switched calls ("voice calls"), and the LTE architecture is well known and is presently being fielded in major metropolitan centers around the world as an improvement in packetized data communications capabilities over the currently fielded EV-DO packetized data network. Additionally well known to those in the art is that LTE is a network exclusive to packetized data. That is, LTE does not support circuit switched events such as conventional cellular voice calls. LTE does provide support for so-called voice over internet protocol (VoIP) calls, but as one skilled in the art will appreciate, the disadvantages associated with present day VoIP techniques (e.g., jitter) make normal use of VoIP in a mobile station highly unlikely from a human factors perspective.

Going forward in the present application, examples and terminology will be employed from both 1× and LTE applications because these are well appreciated and prevalently fielded technologies that can be effectively employed to teach present day limitations and how the present invention is utilized to overcome these limitations. However, the present inventors note that the scope of the present invention is not to be restricted to 1× and LTE, but rather extended to comprehend dual mode cellular architectures where a packetized data radio link 109 employed is utilized for notification services between the mobile station 101 and the interworking interface (or "interworking solution" (IWS)) 112 to provide for fallback from the packetized data radio link 109 to the circuit switched radio link 106 in order to initiate or receive a voice call or other event that is associated with the circuit switched link 106 or that requires timing and quality of service properties unique to circuit switched applications.

In specific 1× and LTE terminologies, the packetized data mobility entity 116 is referred to as a mobility management entity (MME), which is the primary access node for an LTE network. The MME interfaces to many packetized data base stations 110, which are known as eNBs. As noted above, the interworkng interface 112 is known as an interworking solution (IWS) and is responsible for interfacing a circuit switched network such as 1× to the LTE network. Hence, when packetized data is being transmitted over the packetized data network to the mobile station, for purposes of the present application, the circuit switched elements 102, 107, 112 shown in the architecture 100 are effectively idle. Packetized data is being routed to/from the internet via the packetized data switching center 118, through the packetized data mobility entity 116, through the packetized data base station 110, and over the packetized data radio link 109 to/from the packetized data modem 104 within the mobile station.

But when a timely circuit switched event (e.g., a call) comes into the mobile switching center 114 that is targeted for the mobile station 101, the mobile station 101 must be notified—over the packetized data radio link 109—that it must, in a timely fashion, cease processing packetized data and fall back to the circuit switched radio link 106 in order to proceed further, that is, to accept the call. Yet, because circuit switched and packetized data protocols are not equivalent, designers are working to provide techniques and mechanisms that allow for this notification to take place. One such mechanism that is employed in the 1×/LTE environment is tunneling, whereby essential circuit switched data (TCSDATA) 121 providing for notification, acknowledgement, and negotiation of circuit switched parameters associated with initiation, acceptance, or rejection of a call and fallback to a circuit switched radio link 106 are encapsulated as the data portion within higher level data packets 120 that are transmitted/received over the packetized data network, which includes links 115, 119, and 109. Hence, as the name implies, circuit switched notification data 121 employs a data packet as a tunnel through which essential circuit switched parameters are transmitted/received.

The interworking interface 112 performs the interface between the mobile switching center 114 and the packetized data mobility entity 116, and is responsible for most of the processing associated with tunneling the circuit switched data 121. Tunneling packets 120 are routed through the mobility entity 116 and the base station 110 over the links 115, 119, 109, but processing of the data 121 is only required at the endpoints 101, 112. As regards present day circuit switched networks such as 1×, there is a significant amount of networking information addressing, authentication, segmentation and reassembly, radio parameters, etc., which must be processed by the endpoints of a circuit switched event in order to guarantee quality of service. In 1×, the protocol layer at with this information is processed is known as the link access control (LAC) layer. Hence, a LAC layer processor 103 to perform these operations for circuit switched events is depicted within the circuit switched modem 102. Likewise a LAC processor 108 for performing substantially similar layered processing is depicted within the circuit switched base station 107. As one skilled in the art will appreciate, were circuit switched events the only events that were processed by the mobile station 101, then the aforementioned elements 103, 108 would suffice for processing required by the LAC layer.

And the packetized data modem 104 and packetized data base station 110 also include commensurate processing elements (not shown) to support layered communications over the packetized data network. However, in order to provide for notification of circuit switched calls and other events over the packetized data network, tunneling link access control (TLAC) layer processing elements 105, 113 are required in both the internetworking interface 112 and the packetized data modem 104. Certainly, since the primary purpose of the internetworking interface 112 is to interface the circuit switched network to the packetized data network, it follows then that processing of TLAC layer information is necessary.

At a broad level, packetized data applications such as Internet browsing, text messaging, and file transfers rely heavily on dynamic routing of segmented messages over a network. That is, messages are broken into segments and packets and are routed to a destination (e.g., the mobile station 101) over various routes. Consequently, packets may arrive at the destination out of order, or in error, and must be retransmitted and reassembled by apparatus in the destination element. This is the very reason that present day VoIP techniques do not lend themselves favorably toward use—packet delivery cannot be guaranteed at time intervals commensurate with favored use. On the other hand, the timing requirements to favor use in a file transfer, say, are much less demanding. As an example, LTE is very fast for data transfer purposes, but cannot guarantee the timing necessary to support voice activity. In addition, as one skilled in the art will appreciate, there is a distinct possibility that packets will be lost when transmitted over the packetized data network and TLAC layer and lower layer protocols include provisions for reliable end-to-end communication of packetized data. And as is of interest to the present application, GCSNA includes provisions for automatic repeat query (ARQ), also known as automatic repeat request, whereby unacknowledged packets are retransmitted by a sender.

Voice calls, in contrast, demand consistent and dedicated end-to-end quality of service in order to favor use. And circuit switched protocols such as 1×, for example, provide the necessary constraints and checks to ensure high quality of service. As one skilled in the art will appreciate, this quality of service is primarily achieved via dedicated links 106, which may carry no significant information for long periods of time, but which are nevertheless available.

As one skilled in the art will further appreciate, the hardware and software associated with processing circuit switched calls and events and processing packetized data and events is necessarily different. Hence, the dual mode mobile station 101 is depicted as having both a circuit switched modem 102 and a packetized data modem 104. One skilled will further appreciate that design constraints on a present day mobile station such as processing capability and battery life often restrict the mobile station 101 such that it may process events over only one of the two links 106, 109. This application considers the problems associated with incoming/outgoing call notifications, or other circuit switched events between the mobile station 101 and the interworking interface 112 when the mobile station 101 is actively processing packetized data over the packetized data link 109. These and other complexities associated with TLAC layer processing will now be presented in more detail with reference to FIG. 2.

Figure 2:
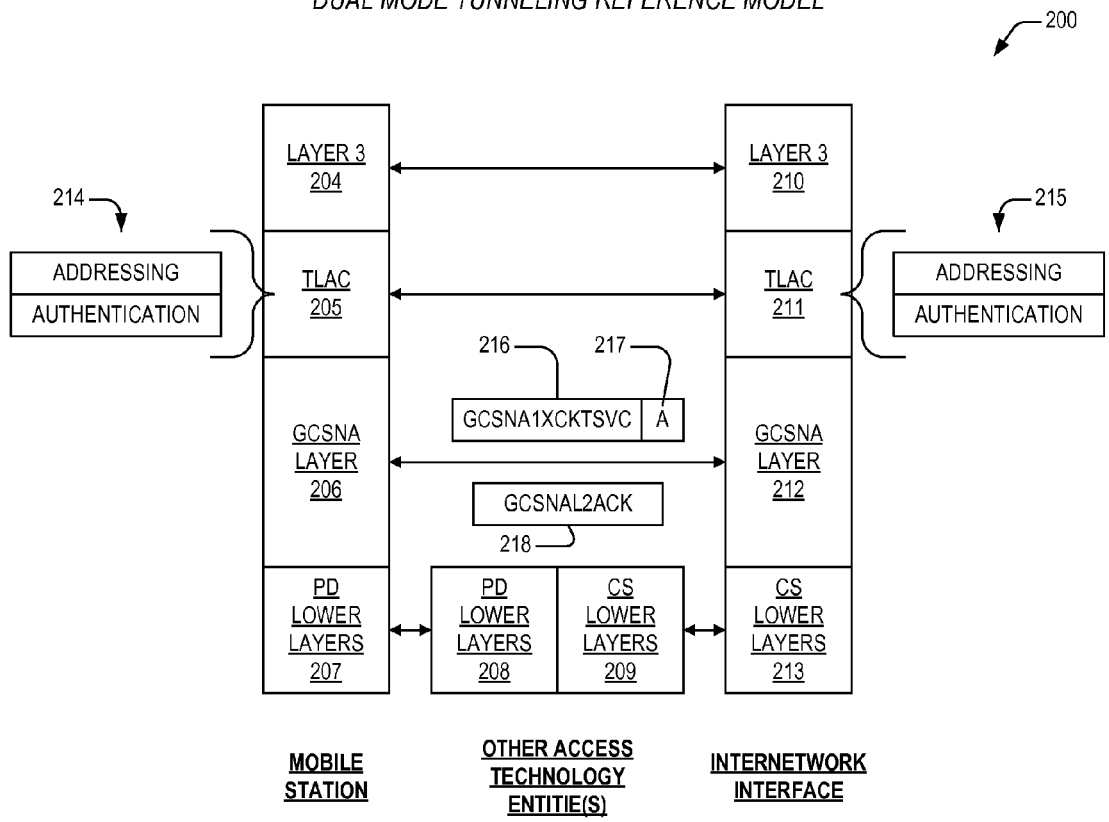
FIG. 2 is a block diagram depicting a present day dual mode tunneling reference model, such as is used to notify the dual mode mobile station of FIG. 1.

FIG. 2 is a block diagram 200 depicting a present day dual mode tunneling reference model, such as is used to notify the dual mode mobile station 101 or interworking interface 112 of FIG. 1. The diagram 200 shows how an internetworking interface communicates with a dual mode mobile station though various other access technology entities, to affect notification of a circuit switched call or other event over a packetized data network, including a packetized data radio link, as has been discussed above with reference to FIG. 1. As in any layered architecture model, each endpoint must replicate each of the network model layers. For example, the interworking interface receives notification of the circuit switched event from the mobile switching center according to a circuit switched layered protocol such as 1×, which includes a highest level, layer 3 210, comprising the notification information itself. Layer 3 data is encapsulated into a data unit corresponding to a tunneling link access control layer 211, which is in turn encapsulated into a data unit associated with a notification application layer 212, which is finally encapsulated into data units corresponding to circuit switched lower layers 213, generally media access layer and physical layer. In a 1×/LTE notification configuration, the notification application layer 212 is often referred to as the general circuit services notification application (GCSNA) layer because GCSNA protocols are employed.

Lower layer data units are communicated over one or more lower layer links the other access technology entities, which replicate lower layers 208-209 commensurate with the radio technologies employed. In general, the interworking interface communicates to a circuit switched lower layer 209 and the mobile station communicates over its packetized data radio link to a packetized data lower layer 208. As noted above, the interworking interface notifies the mobile station over its packetized data radio link of the circuit switched event by tunneling the notification. This encapsulation of circuit switched notification data is performed at layer 3 210 and is transmitted to the mobile station over the packetized data radio link and intervening links.

The other access technology entities affect lower layer translation from circuit switched to packetized data links and thus the notification is received by the mobile station via packetized data at packetized data lower layers 207. Since this is handled by the packetized data modem within the mobile station, not additional processing or resources are required over that required for receipt and transmission of normal packetized data. However, the packetized data modem within the mobile station must also provide processing for each of the corresponding layers 210-212 in the interworkng interface. Hence, the packetized data modem within the mobile station must provide, for circuit switched notification purposes only, processing resources for a notification application layer 206, a TLAC layer 205, and a layer 3 204.

As one skilled in the art will appreciate, the GCSNA protocol provides for a GCSNA1×CIRCUITSERVICE message 216 that is employed to transfer 1× encapsulated circuit switched data as described through the tunnel between the IWS and the mobile station. To provide for ARQ, the GCSNA1×CIRCUITSERVICE message 216 includes an MESSAGESEQUENCE field (not shown) and an ACKREQUIRED field 217. According to the protocol, if a sender (i.e., mobile station or IWS) transmits a GCSNA1×CIRCUITSERVICE message 216 with the ACKREQUIRED field 217 asserted, then the sender shall start an acknowledgement timer (not shown), known as an L2ACKTIMER. If the timer expires prior to reception of a GCSNAL2ACK message 218 from the receiver, then the sender may resend the previously transmitted GCSNA1×CIRCUITSERVICE message 216. The GCANSL2ACK message 218 includes an ACKSEQUENCE field (not shown) that is set to the value of the MESSAGESEQUENCE field for the GCSNA1×CIRCUITSERVICE message 216 which is being acknowledged. The MESSAGESEQUENCE field is a 6-bit modulo 64 number.

Similarly, the Specification requires that, upon reception of a GCSNA1×CIRCUITSERVICE message 216 with the ACKREQUIRED field 217 asserted, a receiver (i.e., mobile station or IWS) sends a GCSNAL2ACK message 218 back to the sender and additionally start a GCSNASEQUENCECONTEXTTIMER (not shown) and store the value of the received MESSAGESEQUENCE field that was received. If another GCSNA1×CIRCUITSERVICE message 216 is received prior to expiration of the GCSNASEQUENCECONTEXTTIMER, then the receiver shall treat the GCSNA1×CIRCUITSERVICE message 216 as a duplicate message and shall discard it.

However, the Specification requires that the values of the GCSNASEQUENCECONTEXTTIMER and the L2ACKTIMER, along with the allowable number of retransmissions of unacknowledged GCSNA1×CIRCUITSERVICE messages 216, are implementation specific. That is, the Specification allows network designers to specify the number of allowable retransmissions, the time to wait for a receiver to acknowledge a GCSNA1×CIRCUITSERVICE message 216 before retransmission, and the time for a receiver to discard GCSNA1×CIRCUITSERVICE messages 216 received having the same MESSAGESEQUENCE field values as duplicates.

At a high level, this level of control by the Specification appears to provide for reliable transmission and reception of GCSNA packets, while also supporting flexibility in network designs. Yet, the present inventors have observed several disadvantages to the approach required by the Specification that could lead to lockup of a mobile station or IWS, and that could certainly cause unnecessary network congestion and overutilization of processing resources.

Consider for example, a network implementation where the value of L2ACKTIMER is set to 160 milliseconds (ms) and the value of GCSNASEQUENCECONTEXTTIMER is set to 300 ms, both realistic values for a present day network. Next, consider at time t=0 that an IWS sends a GCSNA1× CIRCUITSERVICE message 216 with ACKREQUIRED 217 asserted, and the message 216 is received by a mobile station at the notification application layer 206. The IWS, per the Specification, sets an L2ACKTIMER to 160 ms. The received message 216 is forwarded up through the TLAC layer 205 for addressing and authentication validation, and then up to the layer 3 layer 204 for processing of the encapsulated 1× data. In addition, the mobile station, as per the Specification, sets the GCSNASEQUENCECONTEXTTIMER to 300 ms and transmits a GCSNAL2ACK message 218 back to the IWS.

Now consider that the GCSNAL2ACK message 218 is not successfully received by the IWS, that is, circumstances occur over the packetized data network that result in the GCSNAL2ACK message 218 being lost.

Thus, at time t=160 ms, the L2ACKTIMER expires and the IWS retransmits the GCSNA1×CIRCUITSERVICE message 216 with ACKREQUIRED 217 asserted, and starts a second L2ACKTIMER. This retransmission is successfully received by the mobile station, and because the GCSNASEQUENCECONTEXTTIMER is not expired, the mobile station rejects the retransmitted GCSNA1×CIRCUITSERVICE message 216 as a duplicate and sends a second GCSNAL2ACK message 218 back to the IWS. The GCSNASEQUENCECONTEXTTIMER continues to run.

Consider also that the second GCSNAL2ACK message 218 is also lost.

Thus, at time t=320, the IWS retransmits (now a third transmission) the GCSNA1×CIRCUITSERVICE message 216 with ACKREQUIRED 217 asserted, and sets the L2ACKTIMER again. This third transmission is also successfully received by the mobile station, but since the GCSNASEQUENCECONTEXTTIMER (originally set to 300 ms upon reception of the first GCSNA1×CIRCUITSERVICE message 216) has expired, the mobile station accepts the GCSNA1×CIRCUITSERVICE message 216 as a new GCSNA1×CIRCUITSERVICE message 216 instead of a duplicate GCSNA1×CIRCUITSERVICE message 216, and this retransmitted data is forwarded up through the TLAC layer 205 to the level 3 layer 204 for processing.

Consequently, the level 3 layer 204 of the mobile station is presented with duplicate 1× data and is asked to process this data as a new 1× event. This is a problem, and as one skilled in the art will appreciate, such a set of conditions are probable over a present day network and could result in lockup of a mobile station, or at the least inefficient utilization of resources. Considering the number of fallback scenarios that are expected during a day's usage, such utilization wastes time and battery power. The present inventors also note that the above noted scenario could occur with an order of magnitude greater number of consequences if communications were initiated by a number of mobile stations over a period of time to notify a single IWS of 1× call initiations. Accordingly, there is a need for improved techniques for handling ARQ in a dual mode system where GCSNA is employed.

Consequently, the present invention is provided to overcome the above noted limitations, and others, by providing a technique whereby scenarios that allow for reception of duplicate GCSNA messages is precluded. The present invention will now be discussed with reference to FIGS. 3-5.

Figure 3:
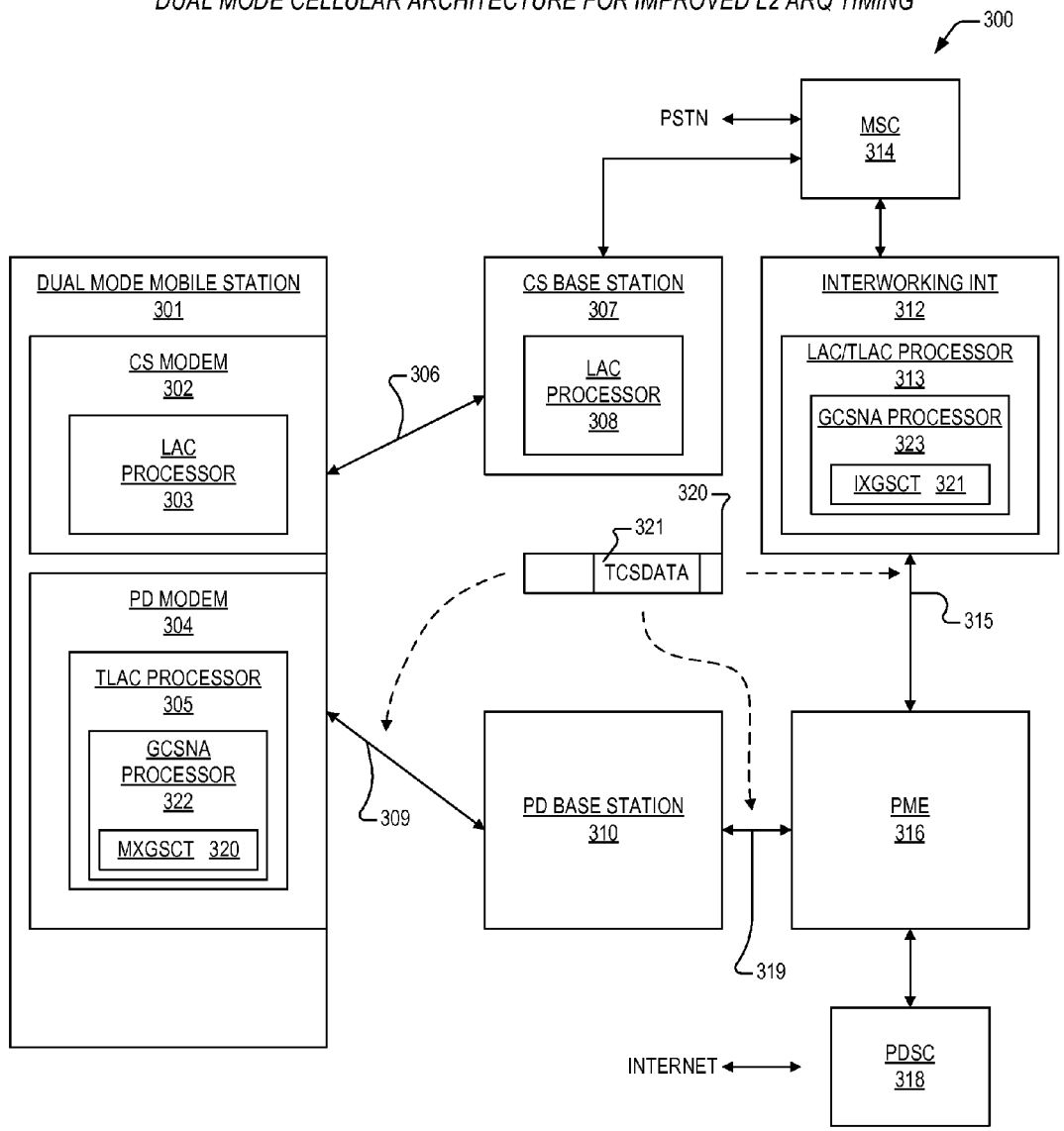
FIG. 3 is a block diagram featuring an improved dual mode cellular architecture according to the present invention.

Turning now to FIG. 3, a block diagram is presented depicting an improved dual mode cellular architecture 300 according to the present invention. The architecture 300 includes the mobile station 301, which has a circuit switched modem 302 for processing circuit switched cellular applications, and a packetized data modem 304, for processing packetized data applications. The mobile station 301 is coupled to a circuit switched base station 307 via a circuit switched radio link 306 and to a packetized data base station 310 over a packetized data radio link 309.

The circuit switched base station 307 is coupled to a mobile switching center 314. The mobile switching center 314 is coupled to an interworkng interface 312. The interworkng interface 312 is coupled to a packetized management entity (PME) 316 via a packetized data link 315. The mobile switching center 314 routes calls and events to/from a public switched telephone network (PSTN). The packetized management entity 316 is coupled to a packetized data switching center 318, which routes data and events to/from a packetized data network such as the internet.

In operation, circuit switched calls and events over the PSTN are routed by the mobile switching center 314 to the circuit switched base station 307. All control and traffic associated with the calls or other events occurs over the circuit switched radio link 306 is processed by the circuit switched modem 302 within the mobile station 301. Likewise, packetized data and events over the internet are routed by the packetized data switching center 318 to a particular packetized data mobility entity 316 that is interfaced to the packetized base station 310 currently assigned to the mobile station 301. All control and traffic associated with the packetized data or other events occurs over the packetized data radio link 309 is processed by the packetized data modem 304 within the mobile station 301.

One embodiment of the present invention contemplates a dual mode mobile station 301 that is capable of processing circuit switched calls and other events over a CDMA radio link 306 such as might be found in a cdma200 1×RTT architecture, and that processes packetized data and other events over a packetized data radio link 309 such as might be found in a Long Term Evolution (LTE) architecture using E-UTRAN as the air interface for packet transfer. Other embodiments of the present invention include mutually exclusive radio links and architectures that require circuit switched fallback substantially similar to that employed by a 1×/LTE dual mode system. These embodiments extend to comprehend dual mode cellular architectures where a packetized data radio link 309 employed is utilized for notification services between the mobile station 301 and the interworking interface (or "interworking solution" (IWS)) 312 to provide for fallback from the packetized data radio link 309 to the circuit switched radio link 306 in order to initiate, receive, or otherwise provide for notifications of a voice call or other event that is associated with the circuit switched link 306 or that requires timing and quality of service properties unique to circuit switched applications.

In specific 1× and LTE terminologies, the packetized data mobility entity 316 is referred to as a mobility management entity (MME), which is the primary access node for an LTE network. The MME interfaces to many packetized data base stations 310, which are known as eNBs. The interworkng interface 312 is responsible for interfacing a circuit switched network such as 1× to the LTE network. Hence, when packetized data is being transmitted over the packetized data network to the mobile station, for purposes of the present application, the circuit switched elements 302, 307, 312 shown in the architecture 300 are effectively idle. Packetized data is being routed to/from the internet via the packetized data switching center 318, through the packetized data mobility entity 316, through the packetized data base station 310,and over the packetized data radio link 309 to/from the packetized data modem 304 within the mobile station.

When a timely circuit switched event (e.g., a call) comes into the mobile switching center 314 that is targeted for the mobile station 301,the mobile station 301 must be notified— over the packetized data radio link 309—that it must, in a timely fashion, cease processing packetized data and fall back to the circuit switched radio link 306 in order to proceed further, that is, to accept the call. In an embodiment directed towards 1×/LTE systems, the architecture 300 architecture according to the present invention employs tunneling, whereby essential circuit switched data (TCSDATA) 321 providing for notification, acknowledgement, and negotiation of circuit switched parameters associated with initiation, acceptance, or rejection of a call and fallback to a circuit switched radio link 306 are encapsulated as the data portion within higher level data packets 320 that are transmitted/received over the packetized data network, which includes links 315, 319, and 309. Hence, circuit switched notification data 321 employs a data packet as a tunnel through which essential circuit switched parameters are transmitted/received.

The interworking interface 312 performs the interface between the mobile switching center 314 and the packetized data mobility entity 316,and is responsible for most of the processing associated with tunneling the circuit switched data 321. Tunneling packets 320 are routed through the mobility entity 316 and the base station 310 over the links 315, 319, 309, but processing of the data 321 is only required at the endpoints 301, 312. In a cdma2000 1×RTT embodiment, this information is processed at a LAC layer processor 303 to perform these operations for circuit switched events is depicted within the circuit switched modem 302. Likewise a LAC processor 308 for performing substantially similar layered processing is depicted within the circuit switched base station 307.

The packetized data modem 304 and packetized data base station 310 also include commensurate processing elements (not shown) to support layered communications over the packetized data network. However, in order to provide for notification of circuit switched calls and other events over the packetized data network, tunneling link access control (TLAC) layer processing elements 305, 313 are provided in both the internetworking interface 312 and the packetized data modem 304.

In one embodiment, the GCSNA protocol is employed by the architecture 300 to provide for automatic repeat query (ARQ), also known as automatic repeat request, whereby unacknowledged packets are retransmitted by a sender. However, in contrast to present day systems, such as the system 100 discussed with reference to FIG. 1, the architecture 300 according to the present invention extends the requirements of the GCSNA protocol and the Specification to include a mobile GCSNA sequence context timer MXGSCT 320 within the TLAC processor 305 of the mobile station 301 and an IWS GCSNA sequence context timer IXGSCT 321 within the LAC/TLAC processor 313 of the interworking interface 312.

Operationally, when the mobile station 301 sends a GCSNA1×CIRCUITSERVICE message 216 with ACKREQUIRED 217 asserted, as is described above with reference to FIG. 2, in addition to starting L2ACKTIMER, the mobile station 301 also starts MXGSCT 320, where the value of MXGSCT 320 is equal to GCSNASEQUENCECONTEXTTIMER, and ceases retransmission of unacknowledged GCSNA1×CIRCUITSERVICE messages 216 when the MXGSCT 320 expires.

Likewise, when the interworking interface 312 sends a GCSNA1×CIRCUITSERVICE message 216 with ACKREQUIRED 217 asserted, as is described above with reference to FIG. 2, in addition to starting its L2ACKTIMER, the interworking interface 312 also starts IXGSCT 321, where the value of IXGSCT 321 is equal to GCSNASEQUENCECON- TEXTTIMER, and ceases retransmission of unacknowledged GCSNA1×CIRCUITSERVICE messages 216 when the IXGSCT 321 expires.

The timers 320, 321 according to the present invention are configured to perform the functions and operations as discussed above. The timers 320, 321 comprises logic, circuits, devices, or microcode (i.e., micro instructions or native instructions), or a combination of logic, circuits, devices, or microcode disposed in a non-transitory memory medium, or equivalent elements that are employed to execute the functions and operations according to the present invention as noted. The elements employed to accomplish these operations and functions within the timers 320, 321 may be shared with other circuits, microcode, etc., that are employed to perform other functions and/or operations within the mobile station 301 and/or the interworking interface 312. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor, complex instructions are translated into associated micro instructions, and the associated micro instructions are directly executed by a unit or units within the CISC microprocessor.

In one embodiment, the values of L2ACKTIMER, GCSNASEQUENCECONTEXTTIMER, and the allowable number of retransmissions of a GCSNA1×CIRCUITSERVICE message 216, are transmitted by the interworking interface 312 to the mobile station during initialization via a GCSNA1×PARAMETERS MESSAGE (not shown).

Via the MSGSCT 320 and the IXGSCT 321, scenarios are precluded where retransmissions of unacknowledged GCSNA1×CIRCUITSERVICE messages 216 are sent after the GCSNASEQUENCECONTEXTTIMER expires.

Several embodiments that employ these timers 320, 321 are provide by the present invention. One embodiment restricts the number of retransmissions to be less than a number which would exceed the value of GCSNASEQUENCECONTEXTTIMER. For example, if the GCSNASEQUENCECONTEXTTIMER is set to 300 ms and the L2ACKTIMER is set to 160 ms, as in the example discussed with reference to FIG. 2, then the number of retransmissions according to the present invention is restricted to one retransmission. This embodiment is discussed generally with reference to FIGS. 4-5.

Figure 4:
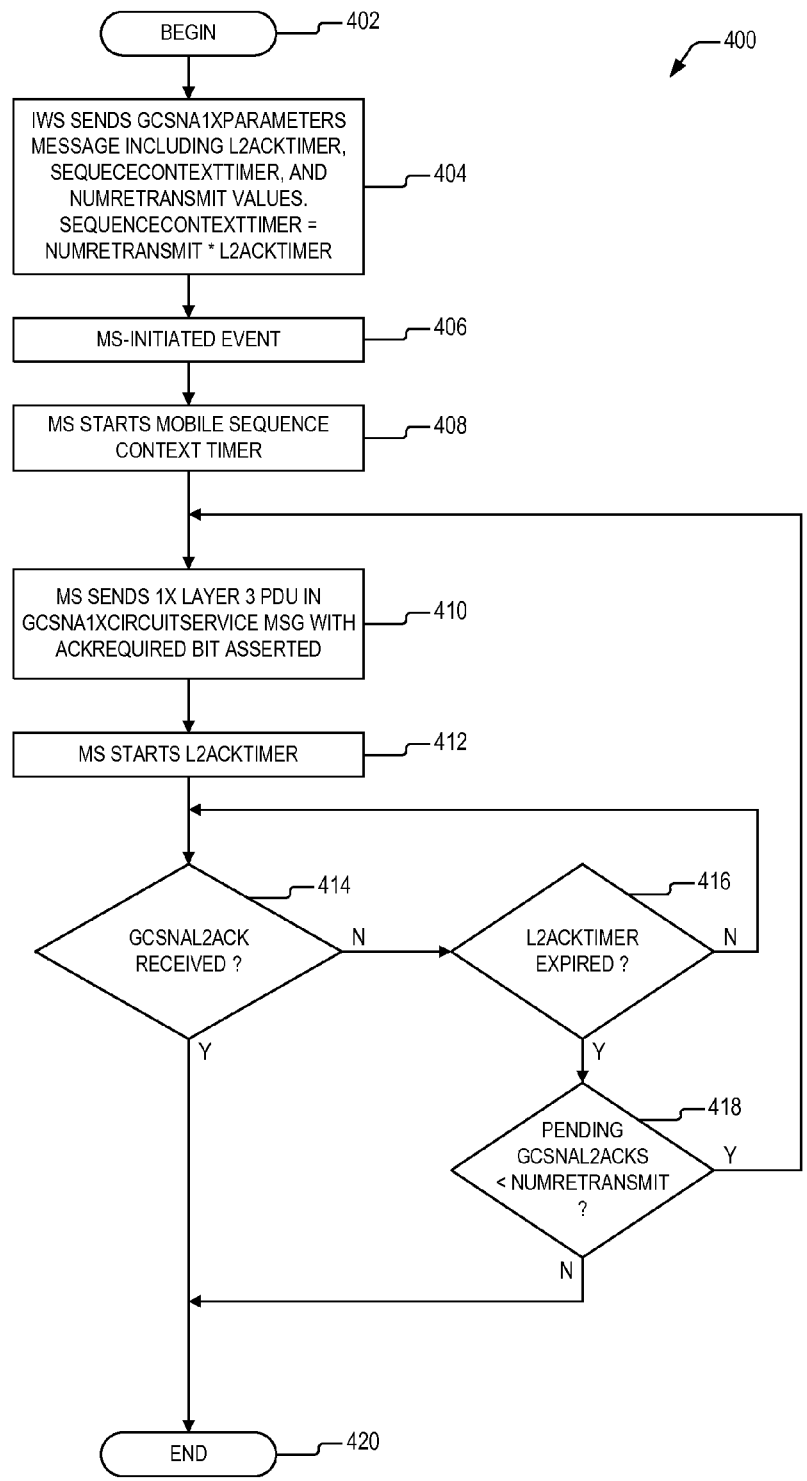
FIG. 4 is a flow diagram showing GCSNA message sequencing according to the present invention for a tunneling exchange that is initiated by a dual mode mobile station.

Referring to FIG. 4, a flow diagram 400 is presented diagram showing GCSNA message sequencing according to the present invention for a tunneling exchange that is initiated by a dual mode mobile station. Flow begins at block 402 where a mobile station according to the present invention registers with or otherwise is initialized into a dual mode architecture network 300 as is described above with reference to FIG. 3. Going forward, GCSNA protocol examples will be discussed with reference to a 1×/LTE dual mode architecture system, however the present inventor notes that such examples are exemplary and are employed to teach the present invention using well known present day technologies. Flow then proceeds to block 404.

At block 404, an IWS according to the present invention transmits a GCSNA1×PARAMETERS message to the mobile station that includes values for an L2ACKTIMER, GCSNASEQUENCECONTEXTTIMER, and also for an allowable number of retransmissions. The allowable number of retransmissions, according to one embodiment, is less than a number which would exceed the value of GCSNASEQUENCECONTEXTTIMER when employing the value of L2ACKTIMER. Flow then proceeds to block 406.

At block 406, a 1× signaling event occurs, such as initiation of a voice call, that requires fallback to the circuit switched 1× network from the LTE packetized data network. Flow then proceeds to block 408.

At block 408, the mobile station 301 starts MXGSCT 320, which is set to the value of GCSNASEQUENCECONTEXTTIMER. Flow then proceeds to block 410.

At block 410, the mobile station 301 sends a TLAC encapsulated 1× layer 3 packetized data unit (PDU) in a GCSNA1×CIRCUITSERVICE message with the ACKREQUIRED field asserted. Flow then proceeds to block 412.

At block 412, the mobile station 301 starts an L2ACKTIMER using the value provided in the GCSNA1×PARAMETERS message. Flow then proceeds to decision block 414.

At decision block 414, an evaluation is made to determine if the mobile station has received a valid GCSNAL2ACK message from the IWS. If not, then flow proceeds to decision block 416. If so, then flow proceeds to block 420.

At decision block 416, the mobile station 301 determines if its L2ACKTIMER has expired. If so, then flow proceeds to decision block 418. If not, then flow proceeds to decision block 414, where the mobile station continues to wait for acknowledgement.

At decision block 418, since the L2ACKTIMER has expired, the mobile station 301 determines if the number of pending GCSNAL2ACK messages is less than the number of allowed retransmissions. If so, then flow proceeds to block 410 where the GCSNA1×CIRCUITSERVICE message is retransmitted. If not, then flow proceeds to block 420.

At block 420, the method completes.

The present inventors note that the method 400 of FIG. 4 applies equally to initiation of a 1× signaling event (such as a call notification) from an IWS to a mobile station according to the present invention. In this case, the IWS sends and retransmits the GCSNA1×CIRCUITSERVICE messages and monitors its L2ACKTIMER, IXGSCT 321, and number of retransmissions.

Figure 5:
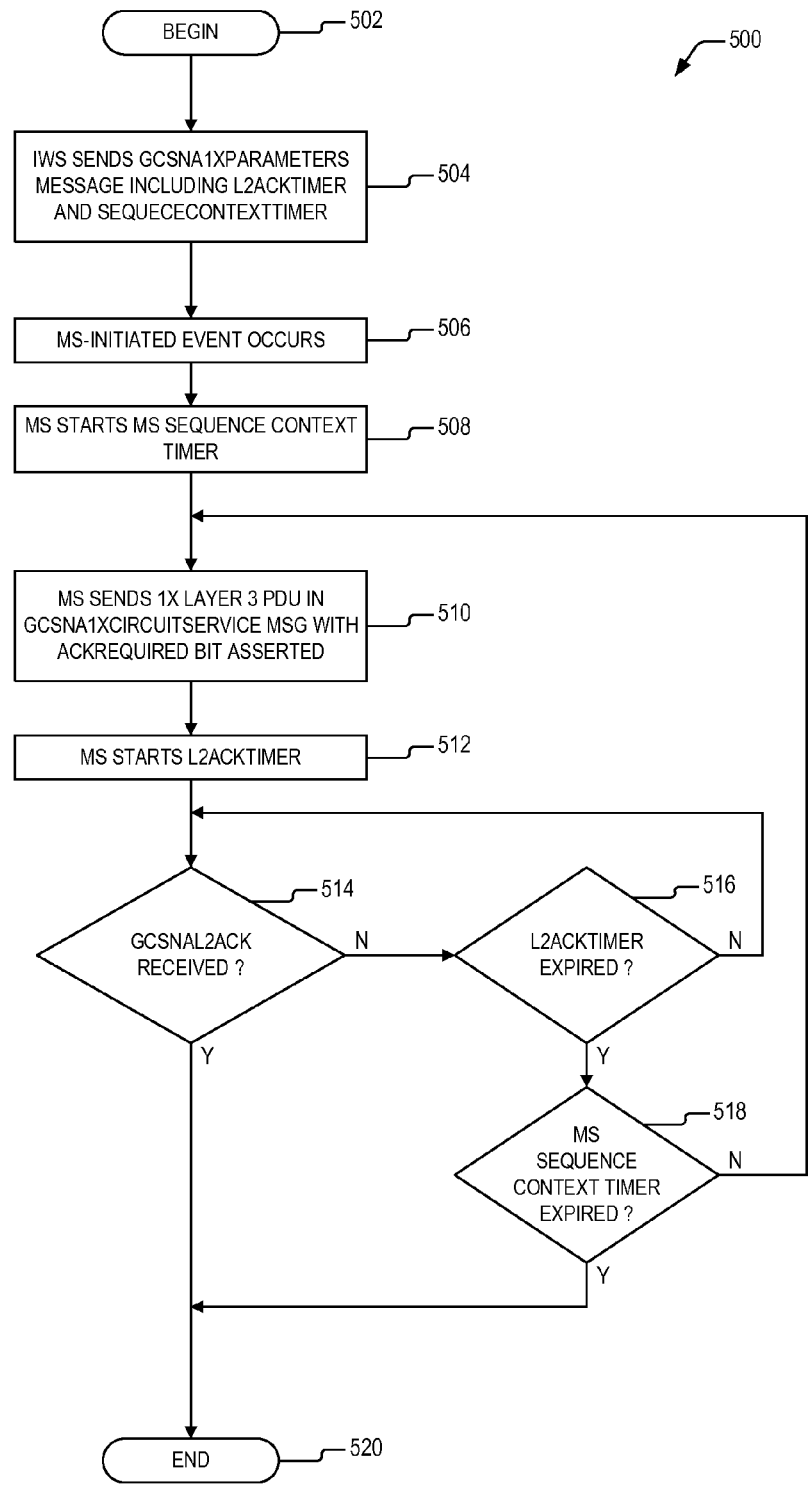
FIG. 5 is a flow diagram showing an alternative GCSNA message sequencing according to the present invention for a tunneling exchange that is initiated by a dual mode mobile station.

Now referring to FIG. 5, a flow diagram 500 is presented diagram showing an alternative GCSNA message sequencing according to the present invention for a tunneling exchange that is initiated by a dual mode mobile station. The present inventors note that since the flow 400 of FIG. 4 restricts the number of allowable retransmissions to be less than the number that would exceed the value of GCSNASEQUENCECONTEXTTIMER given the prescribed value of L2ACKTIMER, it is advantageous to eliminate the tracking of number of pending L2ACKs altogether and alternatively utilize MXGSCT 320 as the primary timer to preclude duplicate detection of retransmitted GCSNA1×CIRCUITSERVICE messages. Hence, flow begins at block 502 where a mobile station according to the present invention registers with or otherwise is initialized into a dual mode architecture network 300 as is described above with reference to FIG. 3. Flow then proceeds to block 504.

At block 504, an IWS according to the present invention transmits a GCSNA1×PARAMETERS message to the mobile station that includes values for an L2ACKTIMER and a GCSNASEQUENCECONTEXTTIMER. Flow then proceeds to block 506.

At block 506, a 1× signaling event occurs, such as initiation of a voice call, that requires fallback to the circuit switched 1× network from the LTE packetized data network. Flow then proceeds to block 508.

At block 508, the mobile station 301 starts MXGSCT 320, which is set to the value of GCSNASEQUENCECONTEXTTIMER. Flow then proceeds to block 510.

At block 510, the mobile station 301 sends a TLAC encapsulated 1× layer 3 packetized data unit (PDU) in a GCSNA1× CIRCUITSERVICE message with the ACKREQUIRED field asserted. Flow then proceeds to block 512.

At block 512, the mobile station 301 starts an L2ACKTIMER using the value provided in the GCSNA1× PARAMETERS message. Flow then proceeds to decision block 514.

At decision block 514, an evaluation is made to determine if the mobile station has received a valid GCSNAL2ACK message from the IWS. If not, then flow proceeds to decision block 516. If so, then flow proceeds to block 520.

At decision block 516, the mobile station 301 determines if its L2ACKTIMER has expired. If so, then flow proceeds to decision block 518. If not, then flow proceeds to decision block 514, where the mobile station continues to wait for acknowledgement.

At decision block 518, since the L2ACKTIMER has expired, the mobile station 301 determines if MXGSCT 320 has expired. If not, then flow proceeds to block 510 where the GCSNA1×CIRCUITSERVICE message is retransmitted. If so, then flow proceeds to block 520.

At block 520, the method completes.

The present inventors note that the method 500 of FIG. 5 applies equally to initiation of a 1× signaling event (such as a call notification) from an IWS to a mobile station according to the present invention. In this case, the IWS sends and retransmits the GCSNA1×CIRCUITSERVICE messages and monitors its L2ACKTIMER, IXGSCT 321, and number of retransmissions.

The present inventors note that the method 500 of FIG. 5 applies equally to initiation of a 1× signaling event (such as a call notification) from an IWS to a mobile station according to the present invention. In this case, the IWS sends and retransmits the GCSNA1×CIRCUITSERVICE messages and monitors its L2ACKTIMER and IXGSCT.

Although the present invention has been discussed with reference to the embodiments of FIGS. 3-5 that disclose use of local message sequence context timers and numbers of retransmissions, other embodiments are contemplated as well. For example, through use of the GCSNA1×PARAMETERS message, an initialized system component (mobile station or IWS) can receive a value, S, such that use of the GCSNASEQUENCECONTEXTTIMER is eliminated altogether. According to one embodiment, a transmitter will stop sending the same GCSNA1×CIRCUITSERVICE message after $2^{S-1}$ transmissions if there are $2^{S-1}$ acknowledgements that are outstanding. Likewise a receiver will consider a GCSNA1×CIRCUITSERVICE message as being a new message after receiving $2^S$ GCSNA1×CIRCUITSERVICE messages.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory, random access memory magnetic) (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An apparatus for providing notifications of a circuit switched event over a packetized data network, the apparatus comprising:
a dual mode mobile station, operatively coupled to a packetized data network, configured to transmit and receive circuit switched fallback notifications to an interworking interface via a tunnel over said packetized data network, said mobile station comprising:
a tunneling link access control processor, configured to transmit a circuit service message to said interworking interface, and configured to monitor said packetized data network for reception of an acknowledgement message from said interworking interface, and configured to retransmit said circuit service message after expiration of an acknowledgement timer, wherein retransmission of said circuit service message is precluded by said tunneling link access control processor when a message sequence context timer expires wherein retransmission is precluded by setting an allowable number of retransmissions to be less than a number that would exceed said message sequence context timer when employing said acknowledgement timer.

2. The apparatus as recited in claim 1, wherein said tunneling link access control processor comprises:

a local message sequence context timer that is set to a value of said message sequence context timer, and that is started upon initial transmission of said circuit service message.

3. The apparatus as recited in claim 1, wherein said dual mode mobile station is compatible with CDMA2000 1×RTT protocol for support of circuit switched services, and is compatible with E-UTRAN protocol for support of packetized data services.

4. The apparatus as recited in claim 3, wherein said tunneling link access control processor employs generic circuit services notification application (GCSNA) protocol to support transmission and reception of said circuit switched fallback notifications.

5. The apparatus as recited in claim 1, wherein said tunneling link access control processor comprises:
a local acknowledgement timer that is set to said acknowledgement timer, and that is started upon initial transmission of said circuit service message.

6. A method for providing notifications of a circuit switched event over a packetized data network, the method comprising:
via a dual mode mobile station that is operatively coupled to a packetized data network, transmitting and receiving circuit switched fallback notifications to an interworking interface via a tunnel over the packetized data network;
via a tunneling link access control processor disposed within the dual mode mobile station, transmitting a circuit service message to the interworking interface, and monitoring the packetized data network for reception of an acknowledgement message from the interworking interface, and retransmitting the circuit service message after expiration of an acknowledgement timer; and
precluding retransmission of the circuit service message by said tunneling link access control processor when a message sequence context timer expires, wherein said precluding comprises:
setting an allowable number of retransmission to be less than a number that would exceed the message sequence context timer when employing the acknowledgement timer.

7. The method as recited in claim 6, wherein the tunneling link access control processor comprises:
a local message sequence context timer that is set to the message sequence context timer, and that is started upon initial transmission of the circuit service message.

8. The method as recited in claim 6, wherein the dual mode mobile station is compatible with CDMA2000 1×RTT protocol for support of circuit switched services, and that is compatible with E-UTRAN protocol for support of packetized data services.

9. The method as recited in claim 8, wherein the tunneling link access control processor employs generic circuit services notification application (GCSNA) protocol to support transmission and reception of said circuit switched fallback notifications.

10. The method as recited in claim 6, wherein the tunneling link access control processor comprises:
a local acknowledgement timer that is set to the acknowledgement timer, and that is started upon initial transmission of the circuit service message.

11. An apparatus for providing notifications of a circuit switched event over a packetized data network, the apparatus comprising:
an interworking interface, operatively coupled to a packetized data network, configured to transmit and receive circuit switched fallback notifications to a dual mode mobile station via a tunnel over said packetized data network, said interworking interface comprising:
a tunneling link access control processor, configured to transmit a circuit service message to said dual mode mobile station, and configured to monitor said packetized data network for reception of an acknowledgement message from said dual mode mobile station, and configured to retransmit said circuit service message after expiration of an acknowledgement timer, wherein retransmission of said circuit service message is precluded by said tunneling link access control processor when a message sequence context timer expires, wherein retransmission is precluded by setting an allowable number of retransmissions to be less than a number that would exceed said message sequence context timer when employing said acknowledgment timer.

12. The apparatus as recited in claim 11, wherein said tunneling link access control processor comprises:
a local message sequence context timer that is set to said message sequence context timer, and that is started upon initial transmission of said circuit service message.

13. The apparatus as recited in claim 11, wherein said interworking interface is compatible with CDMA2000 1×RTT protocol for circuit switched services, and is compatible with E-UTRAN protocol for packetized data services.

14. The apparatus as recited in claim 13, wherein said tunneling link access control processor employs generic circuit services notification application (GCSNA) protocol to support transmission and reception of said circuit switched fallback notifications.

15. The apparatus as recited in claim 11, wherein said tunneling link access control processor comprises:
a local acknowledgement timer that is set to said acknowledgement timer, and that is started upon initial transmission of said circuit service message.

16. A method for providing notifications of a circuit switched event over a packetized data network, the method comprising:
via an interworking interface that is operatively coupled to a packetized data network, transmitting and receiving circuit switched fallback notifications to a dual mode mobile station via a tunnel over the packetized data network;
via a tunneling link access control processor disposed within the interworking interface, transmitting a circuit service message to the dual mode mobile station, and monitoring the packetized data network for reception of an acknowledgement message from the dual mode mobile station, and retransmitting the circuit service message after expiration of an acknowledgement timer; and
precluding retransmission of the circuit service message by said tunneling link access control processor when a message sequence context timer expires, wherein said precluding comprises:
setting an allowable number of transmissions to be less than a number that would exceed the message sequence context timer when employing the acknowledgement timer.

17. The method as recited in claim 16, wherein the tunneling link access control processor comprises:
a local message sequence context timer that is set to the message sequence context timer, and that is started upon initial transmission of the circuit service message.

18. The method as recited in claim 16, wherein the interworking interface is compatible with CDMA2000 1×RTT protocol for support of circuit switched services, and is compatible with E-UTRAN protocol for support of packetized data services.

19. The method as recited in claim 18, wherein the tunneling link access control processor employs generic circuit services notification application (GCSNA) protocol to support transmission and reception of said circuit switched fallback notifications.

20. The method as recited in claim 16, wherein the tunneling link access control processor comprises:
    a local acknowledgement timer that is set to the acknowledgement timer, and that is started upon initial transmission of the circuit service message.

\* \* \* \* \*